PIEZOELECTRIC ULTRASONIC TRANSDUCERS

Original Filed Aug 6, 1964

INVENTOR
N. F. FOSTER
BY Roy M. Porter Jr.
ATTORNEY 3,492,509
PIEZOELECTRIC ULTRASONIC TRANSDUCERS Norman F. Foster, Mendham, N.J., assignor to Bell Telephone Laboratories, Incorporated, New York, N.Y., a corporation of New York Original application Aug. 6, 1964, Ser. No. 387,837. Divided and this application July 24, 1967, Ser. No. 669,327
Int. Cl. H03k 3/26
U.S. Cl. 307—299 5 Claims

ABSTRACT OF THE DISCLOSURE

A piezoelectric ultrasonic transducer formed by evaporating a semiconductive material, such as cadmium sulfide, having latent piezoelectric properties onto a heated substrate where it recrystallizes into piezoelectrically aligned crystals. The resistivity of the layer is raised so it can support a piezoelectric field. The piezoelectric axis of the layer is directed at an acute angle to the thickness of the layer so that components of both shear and longitudinal mode vibration are produced. Mode filters may be used to purify one or the other mode.

This application is a division of my application Ser. No. 387,837, filed Aug. 6, 1964, which was in turn a continuation-in-part of my application Ser. No. 320,379, filed Oct. 31, 1963 and relates to piezoelectric transducers for use with ultrasonic delay lines. More particularly, it relates to transducers fabricated from high resistivity piezoelectric semiconductive materials.

Recently considerable attention has been given to the latent piezoelectric properties of semiconductive materials. These materials include the hexagonal semiconductive compounds of Group II–VI such as cadmium sulfide and zinc oxide. In order that these latent properties may manifest themselves, at least three different parameters of the materials must be particularly controlled. These parameters include the size of the crystals of the material, the orientation of the piezoelectric axis of each crystal both in terms of alignment with other crystals and with the vibration required for the ultrasonic mode desired, and finally, the resistivity of the material which must be high enough that the piezoelectric field is not shorted out. These parameters do not naturally occur in the proper combination to produce a substantial piezoelectric phenomenon, which explains why the piezoelectric properties of these materials have only recently been observed.

In the copending application of D. L. White Ser. No. 208,185 filed July 3, 1962, now Patent 3,240,962 granted Mar. 15, 1966 suitable transducer layers of semiconductive material are described in which the crystallographic parameters of the layer are determined by the crystallographic properties of a substrate upon which or from which the layer is formed. The resistivity of the layer is determined by controlling its impurity content during its formation. While transducers thus formed appear to have potentialities at moderately high frequencies, at frequencies above 100 megacycles the presence of the substrate becomes a disadvantage. Since this substrate was chosen for its crystallographic compatibility with the transducer material it is unlikely to have optimum acoustical properties. Furthermore, at these high frequencies both the resistivity of the substrate, and the bond required to fasten it to an associated delay medium become disadvantages.

It is therefore an object of the present invention to improve ultrasonic semiconductive piezoelectric transducers.

It is a more specific object to form a layer of oriented high resistivity semiconductive material of moderately large crystals upon an ultrasonic delay medium having any predetermined and desired acoustical properties.

In accordance with the invention is has been discovered that a layer produced by evaporative techniques upon a thin metallic substrate can exhibit piezoelectric activity if particular conditions are maintained during the evaporative process and if particular treatment processes are followed after the layer is formed. In particular it has been recognized that when a material such as cadmium sulfide is evaporated upon a metallic substrate that has been heated and held heated during evaporation, the cadmium sulfide tends to deposit on the hot substrate in a crystalline state with crystals of moderate size and with the hexagonal axes of the majority of these crystals aligned with the direction in which the deposited material arrives at the substrate. This crystalline material, however, has a resistivity too low to support a suitable piezoelectric field. In accordance with the invention the resistivity of the semiconductive layer is increased by doping during evaporation, diffusing after evaporation, or otherwise adding a material of the type which when introduced into the layer adds impurities which tend to trap or compensate the current carriers of the material without itself introducing other current carriers. In accordance with a specific feature of the invention, the resistivity is increased by forming adjacent to the semiconductive layer, a layer of conductive material of the compensating type either as the substrate or as an overplating of the layer or both or by adding this compensating material at the time the deposit is formed. Thus, when the semiconductive layer and the compensating material are heated together some of the conductive material will diffuse into the semiconductive layer and raise its resistivity to the desired value. Gold, copper or silver are suitable as to conductive materials for this purpose.

Other features of the invention reside in ways in which the orientation of the piezoelectric axes of the crystals is controlled to control the distribution of the characteristic mode of vibration of the transducer between shear and longitudinal mode components. In general, it has been found that in addition to its dependence upon the direction of arrival of the deposited material, the orientation depends upon the substrate material and the nature of a subsequent heat treatment. Predominant longitudinal mode vibration is produced by slow evaporation in a direction substantially normal to a hot gold substrate. A combination of shear and longitudinal mode vibration is produced by evaporation upon a hot copper substrate followed by a heat treatment. In this case the heat treatment has the effect of causing the orientation of the piezoelectric axes of the crystals on the copper substrate to tip away from its initial position by an amount which depends on the intensity of the heat treatment. Thus, both the longitudinal mode of ultrasonic vibration produced by the component of the axis perpendicular to the substrate and the shear mode produced by the component parallel to the substrate are simultaneously generated. Finally, predominant shear mode vibration is produced by a relatively more rapid evaporation at an acute angle to a relatively cooler silver substrate. The resulting inclination of the piezoelectric axis produces a large shear mode component.

In accordance with a further feature of the invention, the residual component of one or the other of these modes can be suppressed by forming the transducer upon an anisotropic delay medium so oriented that the desired mode propagates along the delay medium while the undesired one is deflected toward the boundaries of the medium where it is scattered or absorbed.

These and other objects and features, the nature of the present invention and its various advantages, will appear more fully upon consideration of the specific illustrative embodiments shown in the accompanying drawings and described in the detail in the following explanation of these drawings.

Figure 1A:
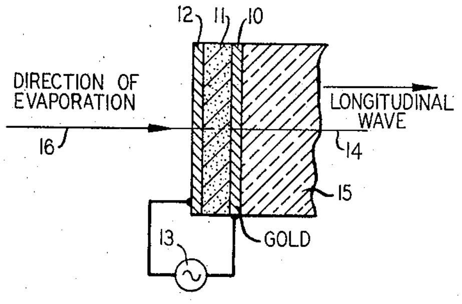
FIGS. 1A and 1B are cross-sectional views of longitudinal and shear wave transducers, respectively, utilizing evaporated layers of high resistivity piezoelectric material in accordance with the invention.

More particularly, FIG. 1A represents the end of a typical delay line 15 within which it is desired to launch longitudinal mode ultrasonic vibrations traveling in a direction parallel to its axis 14. Line 15 may be of quartz, glass or a metal such as aluminum and may have any cross-sectional shape and dimensions. A first layer or film 10 is suitably plated, deposited or otherwise applied by known techniques to an end face of line 15 that is substantially normal to axis 14. Layer 10 may be a conductive material selected from the group including gold, silver and copper, these being known materials that trap current carriers in materials such as cadmium sulfide. However, for longitudinal mode generation it appears preferable that layer 10 be formed from gold for reasons to be set out hereinafter. Depending upon the material of line 15, a known flux such as nichrome may be included between layer 10 and the material of line 15 to facilitate a bond. Layer 11 represents the semiconductive, piezoelectric material formed according to the evaporative process described hereinafter with the evaporant source located away from substrate 10 in a direction represented by the arrow 16 normal to the surface of layer 10. Layer 12 represents a second conductive layer applied over layer 11 and comprises the other electrode of the transducer by means of which an electric field is set up in layer 11 in response to alternating-current signals from source 13 applied between layers 10 and 12.

In accordance with the invention, layer 10 is formed by the particular evaporative technique now to be described. To simplify the description, attention will first be directed specifically to a fabrication of a longitudinal mode transducer as shown in FIG. 1A employing hexagonal cadmium sulfide as the preferred semiconductive material, it being understood that similar compounds would be handled in related ways. For example, other materials having piezoelectric, semiconductive properties of Group II–VI and having either a hexagonal or wurtzite structure may be used to practice the invention. Specific examples in this class are zinc oxide, cadmium selenide, zinc sulfide, and magnesium telluride. In addition, cubic Group II–VI materials such as zinc sulfide (zinc blend), cubic cadmium sulfide and cubic zinc oxide may be employed.

The evaporative procedure involves the use of an evaporator of the type in which the boat containing the evaporant and the jig holding the substrate structure may be separately maintained at different temperatures within a controllable atmosphere. Such evaporators are readily commercially available.

Powdered cadmium sulfide is first placed in the boat of the evaporator and heated to a dull red heat for a few minutes in a vacuum. This step is merely precautionary and allows foreign materials in the form of gases to be driven from the cadmium sulfide. Line 15, upon which gold layer 10 has already been formed, is placed in the evaporator with layer 10 a few inches from the boat containing the cadmium sulfide and located so that layer 10 which constitutes the substrate upon which the evaporated film is deposited is normal to direction from the boat. The evaporator is evacuated, a pressure of from $2\times10^{-6}$ to $6\times10^{-6}$ torr being satisfactory. The substrate is then heated to a temperature sufficiently high to drive off foreign material and other contamination. The cadmium sulfide is then heated to a temperature which causes it to evaporate. A temperature in the range of 750 to 900° C. has proven satisfactory although this temperature has not been found to be critical. The substrate (layer 10) is simultaneously brought to a temperature high enough that the deposited material forms upon it in a crystalline state. A temperature of at least 180° C. and preferably in the range of 200 to 230° C. has proven satisfactory although substrate temperatures above this will produce acceptable results so long as they are sufficiently below the evaporation temperature of the material to be deposited to prevent undue re-evaporation. Temperatures much below 180 C. cause the deposited material to form in an amorphous and disordered state. In general, it has been found that the evaporant and substrate temperatures should have such a relationship to each other that the deposited layer builds up at a rate of less than one micron per minute. Rates much greater than this tend to produce less perfect crystal structures. The total length of time of course depends upon the thickness desired for layer 11 which in turn depends upon the intended operating frequency.

When an appropriate layer has been built up, the temperature of layers 10 and 11 is raised to one substantially above that maintained during evaporation and held in an inert atmosphere for a time selected according to known current carrier compensating principles in order to raise the resistivity of layer 11 to at least $10^6$ ohms/cm. A temperature of approximately 450° C. for a period of approximately one-quarter of an hour has proven satisfactory. Alternatively, current carrier compensating atoms of silver, gold or copper may be deposited along with the deposited semiconductive material during the evaporation process in which case the length of time and temperature required to attain the proper resistivity is reduced or eliminated.

The transducer is completed by adding a second conductive layer 12 upon the surface of layer 11 and suitably attaching conductors to both layers 10 and 12.

If instead of gold as the material for substrate 10, copper is employed, it has been found that the heat treatment following evaporation causes the orientation of the piezoelectric axes of the crystals to tip away from the normal by amounts which depend on the intensity of the heat treatment and that a substantial shear mode component is produced along with a substantial longitudinal mode component. The presence of both modes is useful in an application in which it is desired to produce two signals at precisely spaced times after an input signal. Thus, the input signal from source 13 starts both longitudinal and shear modes traveling toward the output end of the delay line at different characteristic velocities to arrive at the output at different times.

Should it be desired to accentuate one or the other of these modes the following considerations should be taken into account. The tilt angle appears to be dependent upon the severity of the subsequent heat treatment. Therefore, for a smaller angle and a larger longitudinal mode component, lower temperatures and shorter times are preferable. For larger shear wave components, higher temperatures and longer times should be used. In addition, an over-plating of copper as electrode 12 in addition to a substrate 10 of copper both applied before subsequent heat treatment increases the axis rotation.

Figure 1B:
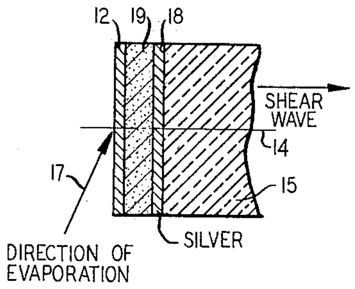

In order to generate an even larger shear wave component, the modification shown in FIG 1B should be used. In FIG 1B reference numerals corresponding to those of FIG. 1A have been employed to designate corresponding components. Modification will be seen to reside in the fact that substrate layer 18 (corresponding to 10 of FIG. 1A) is preferably formed of silver, and that layer 19 representing the semiconductive, piezoelectric layer is deposited from an evaporant source located away from substrate 18 in a direction represented by the arrow 17 which makes an acute angle with the substrate. The evaporative technique described above for FIG. 1A may be substantially followed except that a lower substrate temperature in the range of from 170–200° C. has proven desirable.

While there is no intent to limit the scope of the present invention by the theory now to be presented, this theory is believed to be accurate and consistent with observable facts and accepted scientific principles. Thus, it appears that when the vaporized cadium sulfide is deposited upon the heated substrate, the first material deposited is in the form of randomly oriented crystals of small size. As further material is deposited, those crystals which have their hexagonal axes aligned with the direction in which the new material arrives tend to recrystallize and grow. If this direction is substantially normal to the surface of the substrate as in FIG. 1A, the majority of crystals which grow to moderate size have their axes perpendicular to this surface. If, however, this direction is at an acute angle to the substrate as in FIG. 1B, the crystals tend to grow at acute angles. It has been determined experimentally that crystals tend to grow more rapidly in a normal direction on a gold substrate and more rapidly at an angle on a silver substrate. A possible explanation of this difference resides in the small surface mobility that cadmium sulfide has on silver with which it has a strong chemical bond and the corresponding large surface mobility on gold with which there is a weaker chemical bond. On the other hand when the substrate is copper the subsequent heat treatment tends to tilt the axes of the majority of the crystals away from their initial orientation to a much greater extent than with either silver or gold. This phenomenon has been recognized in the art and has been designated as the Cakenberghe effect even though the reasons underlying it have not been fully explained. Therefore, gold substrate 10 is preferred for the longitudinal wave embodiment of FIG. 1A, a copper substrate for a mixed mode embodiment and a silver substrate for the shear wave embodiment of FIG. 1B.

Regardless of substrate, the formed layer is initially of too low a resistivity to support a satisfactory piezoelectric field. According to a first alternative the resistivity is raised without a previous addition of compensating material by the subsequent heat treatment. It is believed that this increase in resistivity comes about jointly from a diffusion into the material of compensating atoms from the substrate and/or oxygen atoms from the surrounding atmosphere which tend to trap, compensate or otherwise neutralize current carriers resulting from excess cadmium in the deposited material. During this heat treatment the axes of the majority of the crystals may be somewhat tilted away from perpendicular as described above. Alternatively, the resistivity of the layer may be increased by evaporating the compensating atoms along with the semiconductive material or by applying the overlayer 12 of compensating material before the subsequent heat treatment to provide a source of compensating atoms. Alternatively or in combination with compensation, the resistivity of the layer may be increased by rendering it more nearly stoichiometric. For example, in the specific case of cadmium sulfide where the low resistivity of the evaporated layer appears to result from an excess of cadmium which supplies the current carriers, these may be eliminated by heating the layer in a vacuum to drive off the excess cadmium or in air or sulphur vapor to fill the sulphur voids.

Regardless of the method of rending the piezoelectric layer highly resistive, the piezoelectric axis is never completely correctly aligned. Thus, when a signal from source 13 is applied between electrodes 10 and 12, a shear wave or a wave having transverse vibrating components is produced by the component normal to axis 14 and a wave having longitudinal vibrating components is produced by the component parallel to axis 14.

Discrimination can be obtained between the modes on the basis of frequency. For a given transducer there is a center frequency range of operation in which both longitudinal and shear modes are produced with relatively equal efficiency. At frequencies in a range above this latter range the efficiency for the longitudinal mode markedly improves while the efficiency for the shear mode decreases. Conversely, at frequencies below this range efficiency for the shear mode increases and efficiency for the longitudinal mode decreases.

Figure 2:
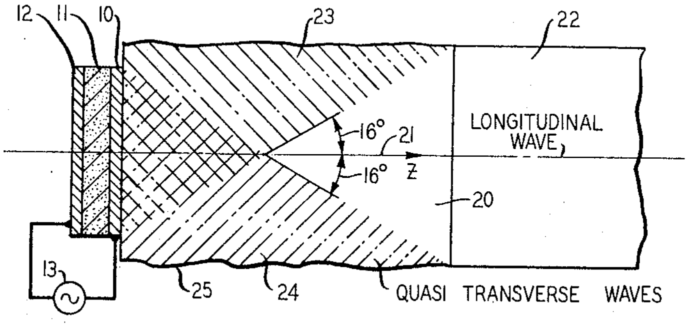
FIG. 2 illustrates the transducer of FIG. 1 in combination with a mode filter, in accordance with the invention, for producing a pure longitudinal ultrasonic vibration.
Figure 3:
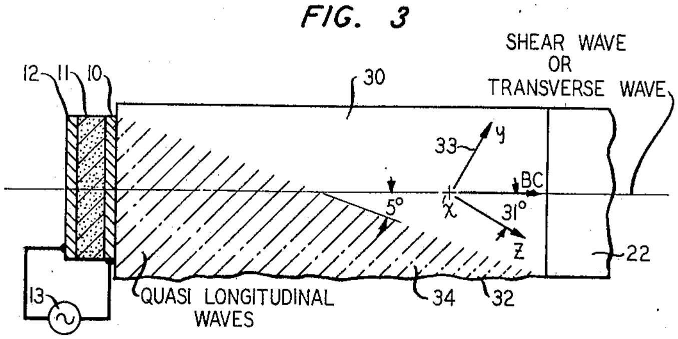
FIG. 3 illustrates the transducer of FIG. 1 in combination with a mode filter, in accordance with the invention, for producing a pure transverse ultrasonic vibration.

In the event that further mode separation is desired, the mode filter combination now to be described with respect to the embodiments of FIGS. 2 and 3 may be employed. In both embodiments use is made of the mode selective propagation properties of anisotropic material, i.e., material in which the elastic moduli changes with orientation relative to the crystal axes. In these materials there are limited directions in which a pure longitudinal wave or a pure shear wave can be propagated. In other directions quasi longitudinal or quasi shear waves are propagated in directions which make angles to the major surfaces of the crystal. While several examples could be given with materials having trigonal, cubic and hexagonal crystals, a single example for each mode in terms of quartz, a trigonal crystal, will serve to illustrate the invention. For a discussion of the large number of cuts having different orientations with respect to the crystal axes of quartz together with a detailed description of the conventional designation of these cuts, reference may be had to either of the texts of W. P. Mason entitled "Electromechanical Transducers and Wave Filters" or "Piezoelectric Crystals and Their Application to Ultrasonics," or the text of R. A. Heising entitled "Quartz Crystals for Electrical Circuits," all published by D. Van Nostrand Company, Inc. of New York.

Referring more particularly to FIG. 2, the transducer comprising layers 10, 11 and 12 is formed according to the process described heretofore upon a bar 20 cut from a single crystal of quartz and upon a face thereof that is normal to the Z or optic axis of the crystal as represented by arrow 21. Such a member is known as a Z-cut bar. Bar 20 may comprise the whole delay line or it may be interposed between the transducer 10–11–12 and a delay line 22.

Waves having both a direction of propagation and a particle motion in the Z direction, i.e., longitudinal waves as hereinabove defined, have a maximum energy flux vector lying along the Z axis. They, therefore, emerge from member 20 with little loss and enter delay line 22. However, waves which have a particle motion normal to the Z axis, i.e., transverse or shear waves, have a maximum energy flux vector at an angle of substantially 16° to the Z axis so that the vector describes a cone as it is rotated about the Z axis. The term conical internal refraction has been applied to this situation. Thus, nonlongitudinal energy from the face of the transducer is directed as "quasi transverse waves," along paths generally designated by the shaded areas 23 and 24 to impinge upon the side boundaries of crystal section 20. These boundaries are made energy dissipative, either by roughening the surface thereof to scatter wave energy or by loading this surface with acoustical absorbing material as represented on FIG. 2 by 25 or both. It should be understood that axes equivalent to the Z axis will have similar properties.

In FIG. 3 shear or transverse waves are passed to the exclusion of longitudinal waves by a BC cut bar 30 of single crystal quartz. As shown by vector symbol 33 the BC axis is that axis at an angle of substantially 31° from the Z or optical axis toward the Y or mechanical axis rotated about the X or electrical axis (extending into the paper in FIG. 3). Transducer 10–11–12 is located upon the face of the crystal normal to the BC axis and surface 32 parallel to the axis is made dissipative as in FIG. 2. Shear or transverse modes propagate without interference parallel to the BC axis to the connected delay line 22. However, waves having a longitudinal particle motion have a maximum energy flux vector substantially 5° away from the BC axis toward the Z axis. Thus, nontransverse energy from the face of the transducer is directed as "quasi longitudinal waves" along paths generally designated by the shaded area 34 to impinge upon the side boundary of section 30 through which the Z axis passes and is there dissipated by being scattered or absorbed by surface 32. It should be understood, of course, that bars cut along equivalent axes such as the AC will have similar properties to a BC cut bar.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A piezoelectric transducer for producing transverse and longitudinal modes of ultrasonic vibration comprising an evaporated layer of cadmium sulfide having latent piezoelectric properties and a piezoelectric axis at an acute angle to the plane of said layer, said layer including means for controlling the composition of said layer to increase the value of the resistivity of said layer to the point at which a significant piezoelectric field can be supported in said layer, and means for impressing an alternating-current electric field across said layer in a direction normal to said plane.

2. A transducer according to claim 1 including a silver substrate for said layer.

3. A piezoelectric transducer for producing a desired mode of ultrasonic vibration comprising a layer of piezoelectric material having latent piezoelectric properties and a piezoelectric axis at an acute angle to the plane of said layer, said layer including means for controlling the composition of said layer to increase the value of the resistivity of said layer to the point at which a significant piezoelectric field can be supported in said layer, means for impressing an alternating-current electric field across said layer in a direction normal to said plane, and a medium having an anisotropic axis and being associated with said layer to receive ultrasonic vibrations from said layer, said anisotropic axis being directed to allow propagation of said desired mode in a direction normal to said layer.

4. A piezoelectric transducer for producing transverse ultrasonic vibrations comprising a layer of piezoelectric material having latent piezoelectric properties and a piezoelectric axis at an angle to the plane of said layer, said layer including means for controlling the composition of said layer to increase the value of the resistivity of said layer to the point at which a significant piezoelectric field can be supported in said layer, means for impressing an alternating-current electric field across said layer in a direction normal to said plane, and a BC cut bar of quartz associated with said layer to receive ultrasonic vibrations from said layer, said bar having said BC axis extending in a direction normal to said layer.

5. A piezoelectric transducer for producing longitudinal ultrasonic vibrations comprising a layer of piezoelectric material having latent piezoelectric properties and a piezoelectric axis at an angle to the plane of said layer, said layer including means for controlling the composition of said layer to increase the value of the resistivity of said layer to the point at which a significant piezoelectric field can be supported in said layer, means for impressing an alternating-current electric field across said layer in a direction normal to said plane, and a Z-cut bar of quartz associated with said layer to receive ultrasonic vibrations from said layer, said bar having the optic axis thereof extending in a direction normal to said layer.

References Cited

UNITED STATES PATENTS

| | | | |
|---|---|---|---|
| 2,938,816 | 5/1860 | Gunther | 117—212 |
| 3,388,002 | 6/1968 | Foster | 117—217 |
| 3,398,021 | 8/1968 | Lehrer et al. | 117—217 |
| 3,435,307 | 3/1969 | Landauer | 307—299 |

JAMES D. KALLAM, Primary Examiner

U.S. Cl. X.R.

317—231, 234